W. H. PHILLIPS.
COMBINED TWINE SPINNING AND BALLING MACHINE.
APPLICATION FILED FEB. 15, 1922.

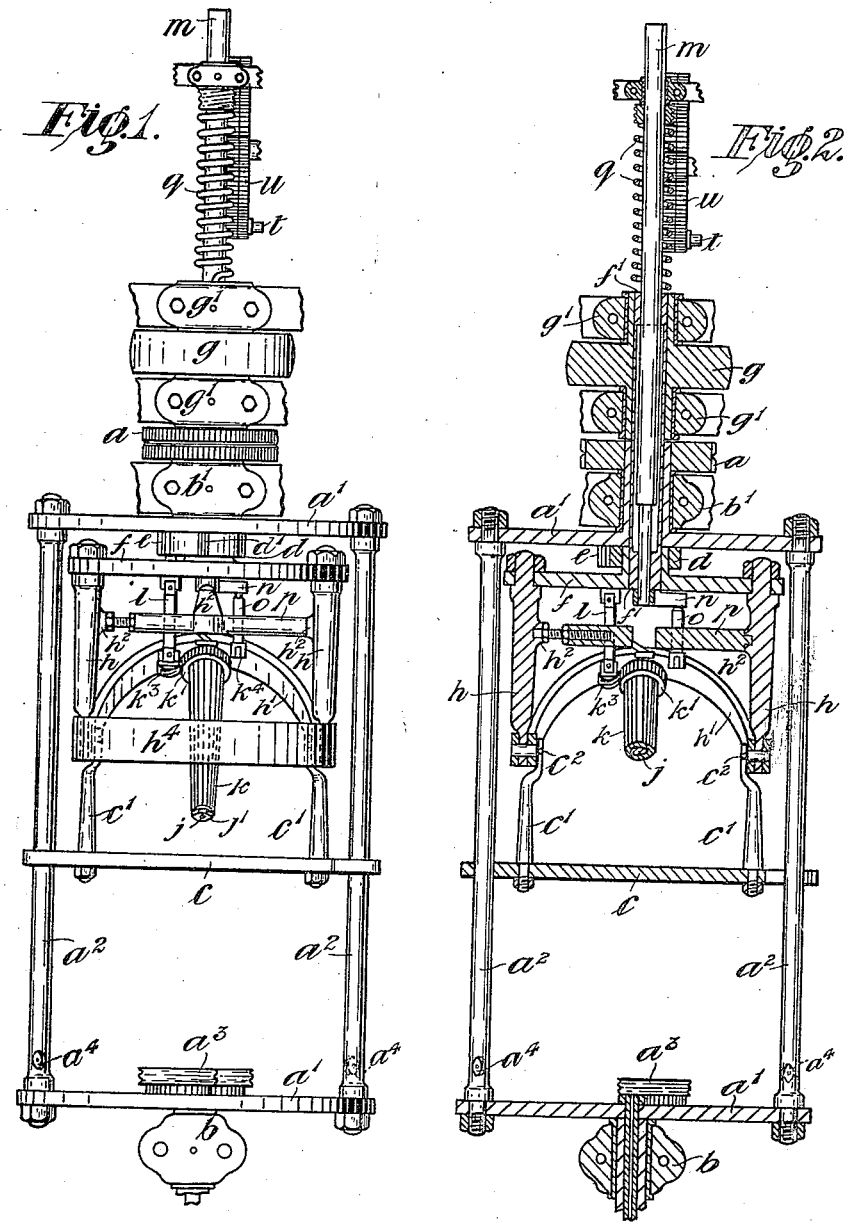

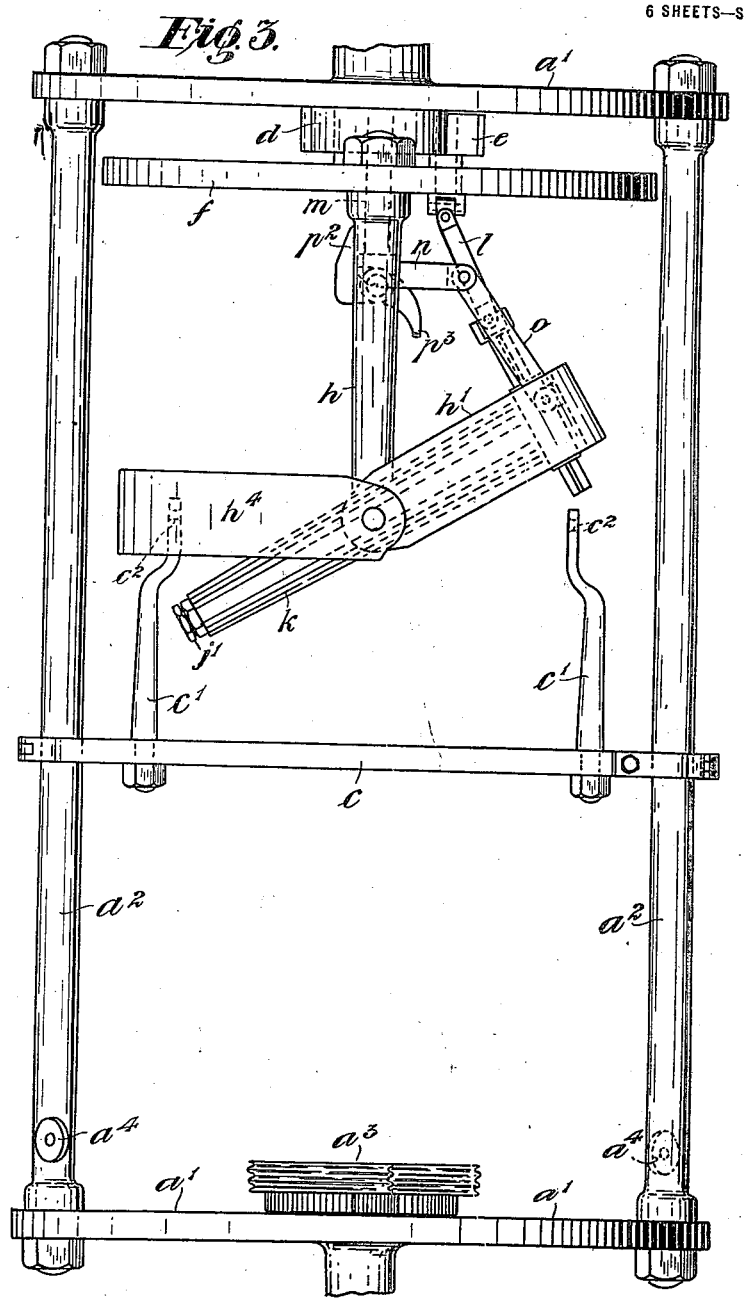

1,436,321.

Patented Nov. 21, 1922.
6 SHEETS—SHEET 3.

William Henry Phillips
INVENTOR;

By
his Attorney.

W. H. PHILLIPS.
COMBINED TWINE SPINNING AND BALLING MACHINE.
APPLICATION FILED FEB. 15, 1922.

1,436,321.

Patented Nov. 21, 1922.
6 SHEETS—SHEET 4.

William Henry Phillips
INVENTOR;
By
his Attorney.

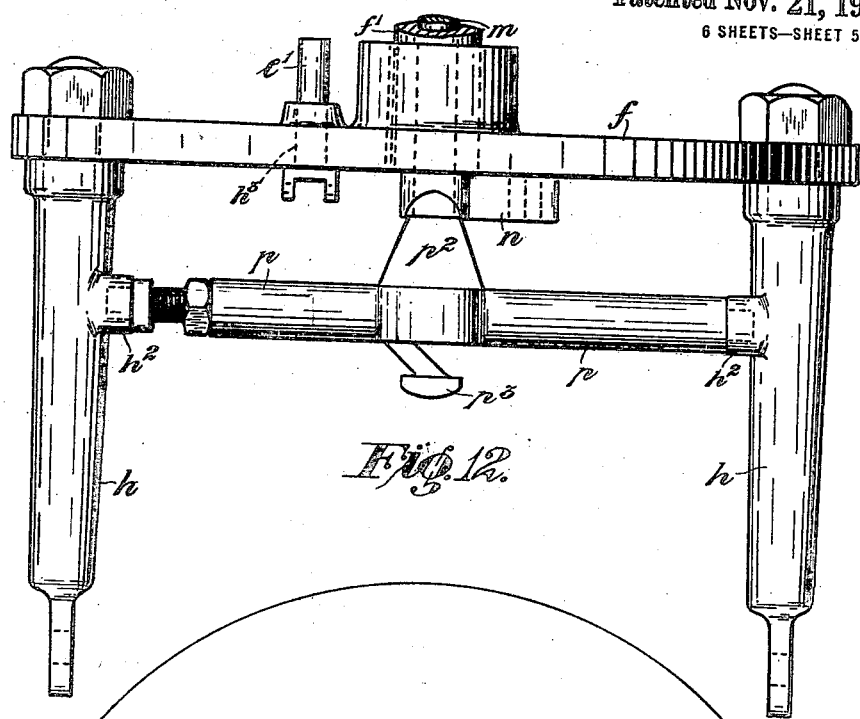
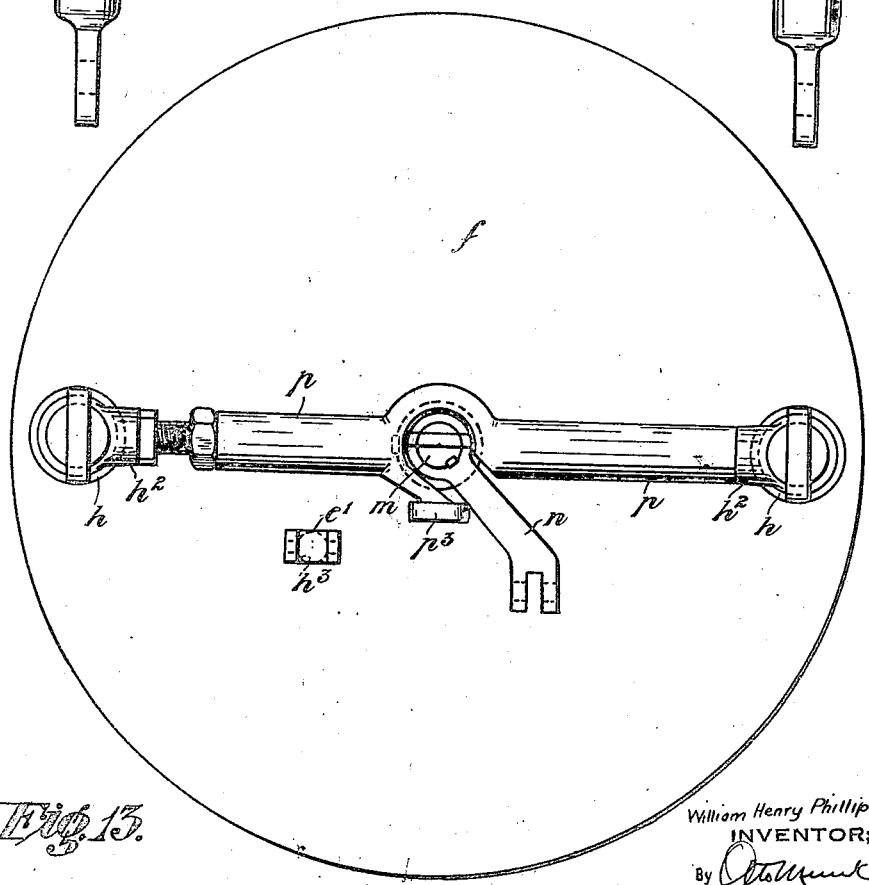

W. H. PHILLIPS.
COMBINED TWINE SPINNING AND BALLING MACHINE.
APPLICATION FILED FEB. 15, 1922.
1,436,321.
Patented Nov. 21, 1922.
6 SHEETS—SHEET 6.
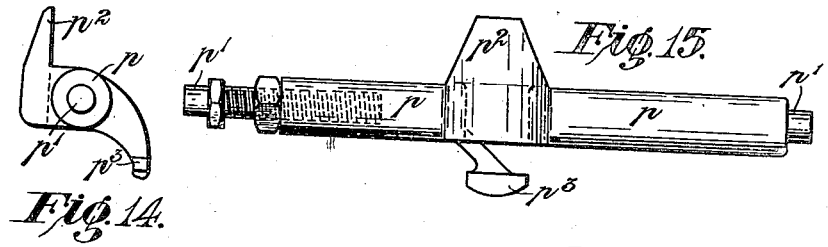
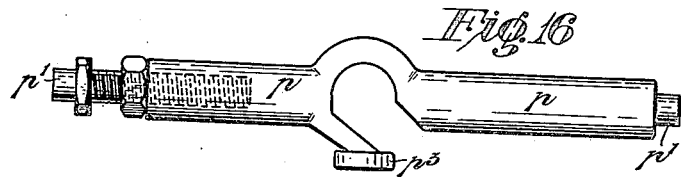
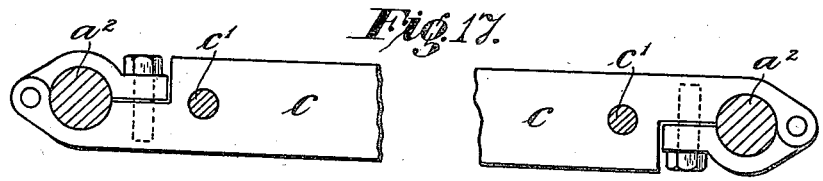
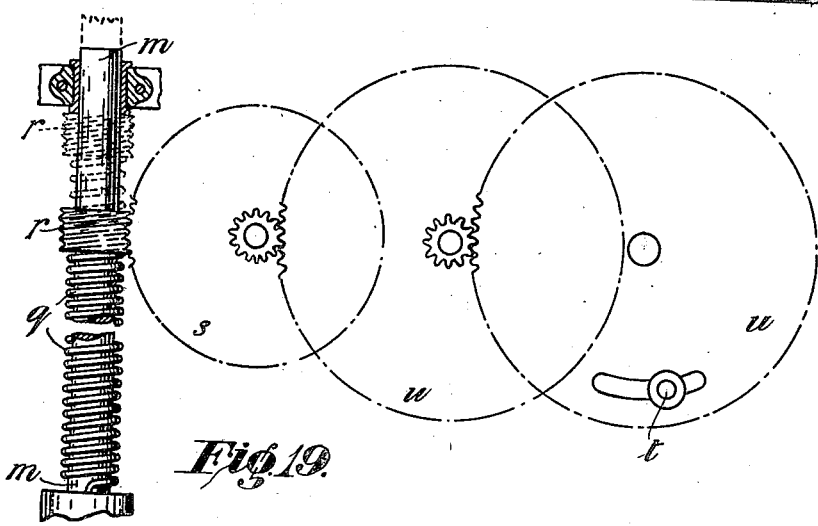
William Henry Phillips
INVENTOR;

Patented Nov. 21, 1922.

1,436,321

UNITED STATES PATENT OFFICE.

WILLIAM HENRY PHILLIPS, OF MILE END, SOUTH AUSTRALIA, AUSTRALIA.

COMBINED TWINE SPINNING AND BALLING MACHINE.

Application filed February 15, 1922. Serial No. 536,682.

*To all whom it may concern:*

Be it known that WILLIAM HENRY PHILLIPS, subject of His Majesty the King of Great Britain, residing at 72 Henley Beach Road, Mile End, in the State of South Australia, Commonwealth of Australia, hath invented certain new and useful Improvements in a Combined Twine Spinning and Balling Machine, of which the following is a specification.

My invention relates to a combined twine spinning and balling machine, the object of the same being to reduce the cost of spinning the twine by simplifying or reducing the operative mechanism and rendering the product suitable for marketing purposes by the use of a single machine.

In order to achieve this object I eliminate the need of a separate reversing machine and balling machine and also obviate the necessity of using the ordinary bobbin, the whole of the process of spinning and balling being achieved by one continuous operation in a single machine. No alteration is made to the actual method of spinning; the twine or cord passes into the machine in the usual manner, but instead of being wound onto a bobbin it is wound directly into a ball on a balling peg from which the twine or cord is ultimately removed in a finished condition and ready for the market.

But in order that my invention may be more clearly understood I will now describe the same by aid of the accompanying illustrative drawings wherein:—

Fig. 1 is a plan of an ordinary spinning machine showing balling mechanism connected therewith.

Fig. 2 plan showing machine with added parts in part section.

Fig. 3 plan of machine on larger scale showing balling mechanism advanced by a quarter of a revolution from previous figures.

Figure 4:
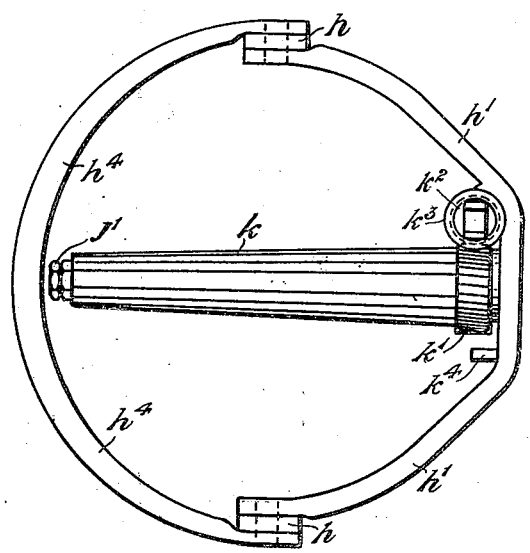

Fig. 4 front elevation of balling peg.

Figure 5:
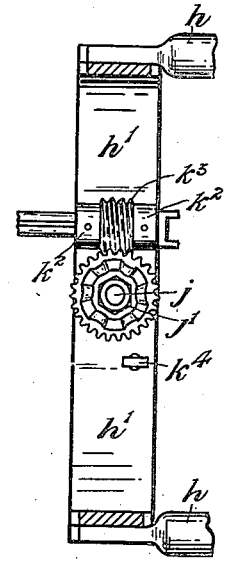

Fig. 5 plan of balling peg.

Figure 6:
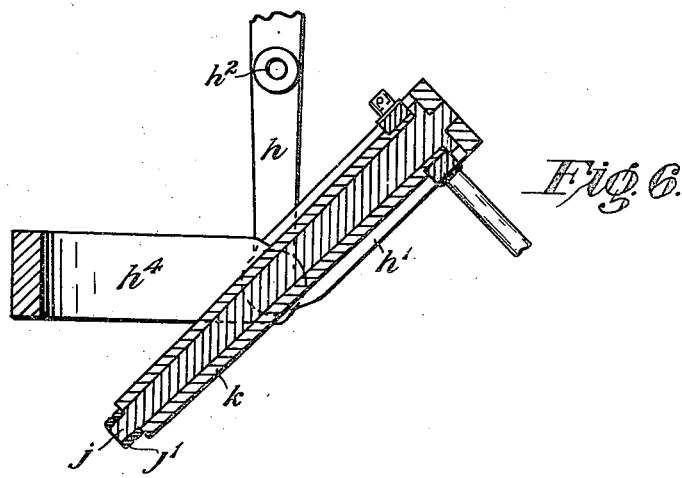

Fig. 6 longitudinal section through peg.

Figure 7:
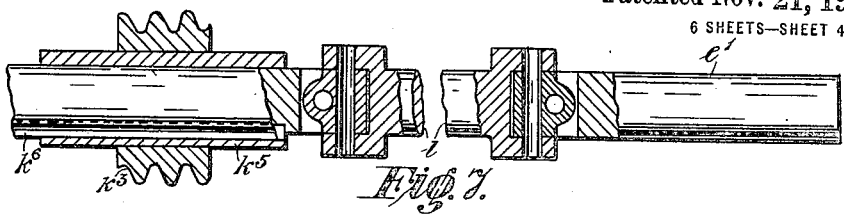

Fig. 7 section through universal jointed shaft of the gear for rotating the balling peg.

Figure 8:
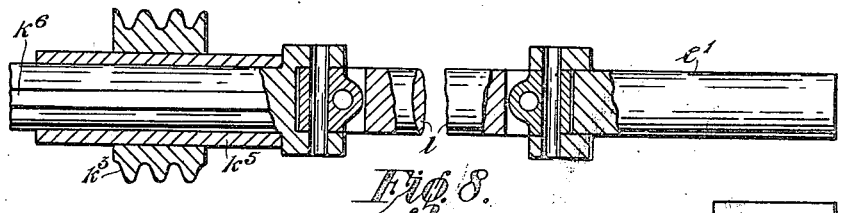

Fig. 8 section through universal jointed shaft at right angles to the position shown in Fig. 7.

Figure 9:
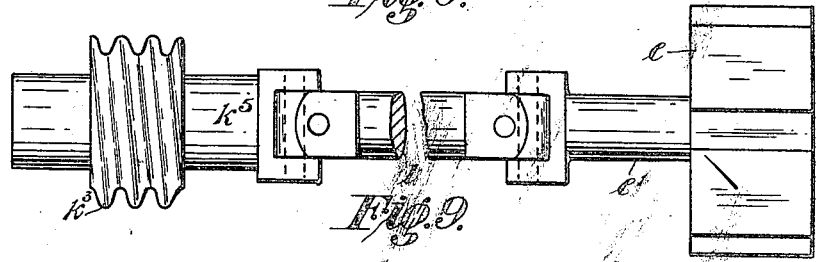

Fig. 9 external view of driving mechanism for balling peg with star wheel attached.

Figures 10, 11:
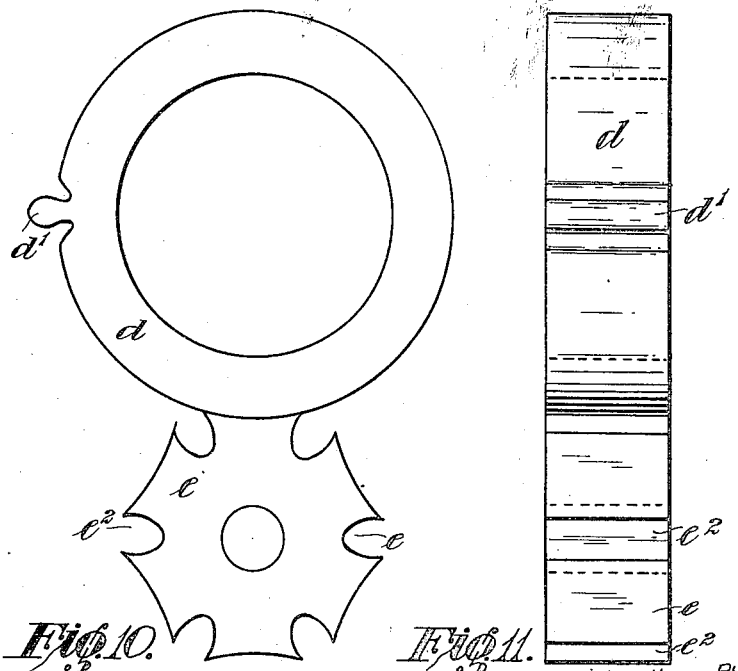

Fig. 10 front elevation of star wheel and single toothed wheel.

Fig. 11 side elevation of star wheel and single toothed wheel.

Fig. 12 side elevation of disc for supporting balling mechanism showing posts attached.

Fig. 13 front elevation of baller discs and posts showing arm used in connection with automatic stop and for adjusting angle of peg.

Fig. 14 end view of pawl for releasing balling peg control.

Fig. 15 side view of Fig. 14.

Fig. 16 plan of Fig. 15.

Fig. 17 side view of cross bar for carrying baller arms.

Fig. 18 plan of Fig. 17.

Fig. 19 adjusting rod carrying worm gearings and spring for actuating a train of wheels for automatically stopping the machine.

In each of the illustrations similar letters of reference are used to denote similar or corresponding parts wherever they occur.

In the drawings $a$ is the chain wheel through which the power is transmitted from any source of supply to the flyer discs $a'$ and flyer rods $a^2$ in the present known manner, the structure being supported at each end on bearings $b$ and $b'$.

The disc for receiving the twine carries the pawl pulleys $a^3$, the disc at the opposite end of the machine being constructed with a hollow shaft or sleeve formation supported in the bearings $b'$ above referred to, the chain wheel $a$ being attached thereto in the usual manner. All of these parts are at present well known and in use.

Approximately at the middle of each rod $a^2$ of the spinning flyer an adjustable cross bar $c$ is attached through which projecting arms $c'$ extend to carry the twine from a roller $a^4$ on to the flyer rod through a hole $c^2$ on the arm $c'$.

In actual practice I provide a peg which takes the place of the bobbin in the original machine and receives the twine as it is spun and automatically winds it up into the required shape and size of a ball as hereinafter explained.

The second disc of the flyer has a concentric ring $d$ attached to its inner side, the attachment being inside of the spinning flyer proper. This ring has one projecting tooth $d'$ on its periphery and is adapted to engage a star wheel $e$ which is part of the balling mechanism as more clearly shown in Fig. 10 of the drawings.

For carrying the balling mechanism I use a rotary element preferably in the form of a disc or plate $f$ preferably of steel having a long hollow boss or tube $f'$ formed thereon or attached thereto, which takes a bearing on the hollow boss in the spinning flyer disc as shown in Fig. 2, but the tube projects beyond its bearing sufficiently to enable a pulley $g$ to be attached to it. This pulley has a boss on each side, the bosses being supported in bearings $g'$ and driven by a drag or slip pulley (not shown in the drawings) which constitutes part of the original machine and causes the disc or plate $f$ and the ball holder to rotate inside of the spinning flyer.

On the side of the plate opposite to that to which the tube is attached I secure two supports or posts $h$ which are arranged diametrically opposite to each other near the periphery of the plate, and on the ends of these posts I mount the swivelled balling peg holder $h'$.

Approximately midway on each of the posts $h$ I form a lug $h^2$ which acts as a bearing for a portion of the adjusting gear. At another position almost at right angles to th line joining the two posts a hole $h^3$ is formed for the reception of the spindle which carries the star wheel. The position of this hole is indicated in Fig. 13.

The ball holder consists of a circular ring $h'$ and $h^4$ previously referred to which is pivotally divided and each half is swivelled to the posts of the plate $f$ which is used for carrying the balling mechanism as shown in the drawings.

A tapered pin $j$ is fixed to one half of this ring, the said pin being arranged to pass diametrically through the centre and at right angles to the swivelled joints at the post ends and is provided with nuts at the small end $j'$.

On this pin the balling peg $k$ is mounted and consists preferably of a hexagonal fluted tapered sleeve which constitutes the balling peg upon which the twine is wound.

A worm wheel $k'$ is attached to the large end of the sleeve and on one side of the peg I arrange two small bearings $k^2$ on the part $h'$ which supports the spindle for carrying the worm $k^3$ being part of the mechanism which turns the peg as shown more clearly in Figs. 4 and 5 of the drawings.

On the opposite side of the sleeve I construct a lug or projection $k^4$ for connecting up the mechanism for adjusting the angle of the ball holder. The semi-ring $h'$ to which the lug or projection $k^4$ is attached stands at an acute angle to the posts, the angle being automatically adjusted during the balling process, its position being controlled by the mechanism hereinafter referred to.

The other half $h^4$ of the ring acts as a counterbalance and also prevents the ball of twine from becoming dislodged from the balling peg $k$ if by accident it is slipped from its proper position. This ring is free to swivel on the posts $h$ but is prevented from moving further than at right angles to the posts by suitably placed lugs which are provided for limiting its movement.

As it is necessary to turn the peg at various angles during the process of balling in order that the ball may present a suitable appearance for marketing purposes and as a slight variation of speed will be necessary in consequence of this requirement, mechanism is provided of the following nature:—

The second disc $a'$ of the spinning flyer as already stated is provided with a ring $d$ having a single tooth $d'$ which operates a star wheel $e$ to which a spindle $e'$ is attached. The spindle is mounted in the hole or opening $h^3$ in the plate $f$ which carries the balling mechanism and is adapted to rotate at a different speed to the plate itself.

The star wheel $e$ preferably consists of a disc, out of the periphery of which a series of grooves $e^2$ have been cut, these grooves are where the tooth $d'$ of the single toothed ring $d$ engages, one such groove being engaged at each revolution of the single toothed ring. I do not confine myself absolutely to any specific number of teeth but six or seven teeth afford satisfactory results. In between each adjacent two grooves of the star wheel a concave curve is cut corresponding to the convex curvature of the periphery of the single toothed ring.

The periphery of the single toothed ring rotating in its path prevents the star wheel from turning until the tooth comes around and moves the star wheel one point.

The star wheel spindle $e'$ is connected to the hollow worm spindle $k^5$ as shown is Figs. 7, 8, and 9 and the mechanism for turning the peg consists of a universally jointed shaft $l$, said shafting being sleeve jointed in the hollow spindle $k^5$ to permit of extension along the feather $k^6$. By this means turning motion is transmitted to the balling peg sleeve irrespective of its position.

The mechanism for adjusting the peg consists of a solid adjusting rod $m$ passing through the centre of the hollow tube $f'$ of the plate which carries the balling mechanism. Projecting beyond the end of this tube to the end inside of the spinning flyer and beyond the plate or disc carrying the balling mechanism I attach an arm $n$ at right angles to the rod previously mentioned, and on the end of this arm a connecting rod $o$ is swivel mounted to connect the adjusting rod and the semi-ring which carries the balling peg of the ball holder.

The baller posts $h$ have two bearings $h^2$ previously referred to in the posts which support a bar $p$ having two projections or lugs $p^2$ and $p^3$ (Figs. 15 and 16) arranged approximately at right angles on the bar for the purpose of controlling the balling peg movement, the lug $p^2$ being adapted to come into contact with the adjusting rod $m$ to hold it against the spring tension $q$ at a somewhat flat angle.

The other lug $p^3$ eventually comes into contact with the ball of twine which is being spun so that when the ball reaches the required size it impinges upon the lug $p^3$ and shifts the lug $p^2$ which has previously been accommodated in a recess in the end of the adjusting rod $m$ and allows the adjusting rod $m$ to move forward by releasing the spring tension. It will be seen that the rod $p$ is constructed with a slot or recess $p^4$ in its central portion which lies in the path of the sliding adjusting rod.

When the rod $p$ is partially rotated by the pressure of the ball upon the lug $p^3$ it clears the path for the adjusting rod and allows it to slide forward and simultaneously moves the balling peg holder to another angle without delaying the spinning process thus enabling the final winding of the twine which constitutes the cover of the ball to be made.

The opposite end of the adjusting rod $m$ carries the spring $q$ above referred to and also a worm or tangent screw $r$ which engages a worm wheel $s$ which is bracketed to the frame of the machine. This worm gear is out of action during the early part of the spinning and balling process, but when the ball has reached its proper size the mechanism is adapted to operate in such a manner that at a predetermined point of the revolution of the worm wheel a projection $t$ on the last of the train of reducing wheels $u$ comes into contact with a stopping lever and automatically stops the machine. This condition is reached when the ball of twine has been wound to its full size, but continues to rotate for the remainder of the finishing winding.

From the foregoing descriptive specification it will readily be understood that the twine which is admitted to the spinning machine passes directly from the pulley $a^4$ through one or other of the openings $c^2$ on the end of the corresponding rod $c'$ and from thence to the balling peg which is operated and adjusted within the structural parts of the spinning machine, thus dispensing with the bobbin as at present in general use and rendering it unnecessary to submit the material in the process of winding on a bobbin and subsequently reversing and balling the twine on separate machines.

Having now fully described and ascertained my said invention and the manner in which it is to be performed I declare that what I claim is:—

1. In a combined twine spinning and balling machine having flyer discs and flyer rods, a rotating element arranged between the flyer discs and the flyer rods and having its axis in alignment with the axle of the flyer discs and provided with projecting supports, a swivel holder pivoted in said supports, means for oscillating said holder, a balling peg mounted in said holder, and means for rotating the balling peg simultaneously with the oscillating movement thereof.

2. A combined twine spinning and balling machine, as claimed in claim 1, including a member movable with the flyer rods adapted to convey twine from the flyer rods to the said balling peg, substantially as described.

3. A combined twine spinning and balling machine, as claimed in claim 1, including an adjustable cross bar mounted on the flyer rods, and arms carried by said cross bar and provided with openings for conveying twine from the flyer rods to the balling peg, substantially as described.

4. In a combined twine spinning and balling machine, the combination with flyer and baller discs, of a star wheel mounted on the baller disc, a balling peg operatively connected with said star wheel, and a single toothed wheel mounted on the adjacent flyer disc and disposed so as to bring the single tooth into engagement with the said star wheel to impart rotary motion to the latter and thence to the balling peg.

5. In a combined twine spinning and balling machine, the combination with flyer and baller discs, of projecting supports carried by the baller disc, a swivel holder pivoted in said supports, a balling peg mounted in the holder, and mechanism for revolving the balling peg comprising a star wheel mounted on the baller disc, a universally jointed connecting rod attached at one end thereto, a hollow spindle for said peg and having a tangent screw on a portion thereof, and operating means mounted in the said holder and connected to the opposite end of said connecting rod for imparting rotary motion to said tangent screw.

6. In a combined twine spinning and balling machine, the combination with a baller disc and a star wheel mounted thereon, of a universally jointed connecting rod operated by rotary movement of the said star wheel, a worm wheel at the opposite end of said connecting rod, a balling peg supported from said baller disc, and a tangent screw carried thereby and adapted to mesh with said worm wheel for rotating the balling peg.

7. In a combined twine spinning and balling machine, the combination with a baller disc having projecting supports, of a balling peg holder comprising two half rings swivel mounted on said supports, and a balling peg mounted on one of said half rings, the latter half ring being adapted to function as a foundation for the balling peg, and the other half ring performing as a counterbalance.

8. In a combined twine spinning and balling machine, the combination with flyer discs and flyer rods, of a balling peg holder supported between the flyer rods, said holder being provided with a lug projecting from the base thereof, a balling peg carried by the holder, a connecting rod attached at one end to said lug, and means for operating the peg holder comprising an adjusting rod movable axially of said flyer discs, and an arm disposed at right angles to the adjusting rod and connected to the opposite end of said connecting rod, whereby axial movement of the adjusting rod will operate the connecting rod to vary the inclination of the balling peg holder.

9. In a combined twine spinning and balling machine, including a baller disc provided with two projecting supports and a balling peg holder pivoted between the supports, the holder being provided with a balling peg, the combination with an adjusting rod movable axially of said disc and operatively connected with the said holder, of a bar having a central opening and pivoted between the two supports, the said bar being provided with two projections respectively for holding the adjusting rod back to enable the balling peg holder and peg to be maintained at a relatively flat angle and to make contact with the ball of material when the latter has attained the required size, whereby the other projection will be raised and the adjusting rod released, and a spring adapted to cause the adjusting rod to move forward when released to alter the position of the holder and peg.

10. In a combined twine spinning and balling machine, the combination with a spring tensioned adjusting rod movable axially, of a tangent screw mounted on the back end of the adjusting rod, a train of reducing wheels adapted to be operated by said tangent screw, and a projection carried by the last of the chain of wheels for operating a stopping lever.

In testimony whereof he hath affixed his signature in presence of two witnesses.

WILLIAM HENRY PHILLIPS.

Witnesses:
 JOHN HERBERT COOKE,
 PHILLIS BACH.